United States Patent

Oehl

[15] 3,693,467
[45] Sept. 26, 1972

[54] SELECTOR LEVERS FOR VARIABLE-RATIO TRANSMISSIONS OF MOTOR VEHICLES

[72] Inventor: Adolf Oehl, Eulenrech, Germany
[73] Assignee: General Motors Corporation, Detroit, Mich.
[22] Filed: Jan. 11, 1971
[21] Appl. No.: 105,184

[30] Foreign Application Priority Data

Jan. 27, 1970  Germany .........G 70 02 581.9

[52] U.S. Cl. ................................74/473 R, 74/523
[51] Int. Cl. .................................................G05g 9/00
[58] Field of Search .....74/473, 473 P, 490, 523, 524

[56] References Cited

UNITED STATES PATENTS

| | | | |
|---|---|---|---|
| 3,315,537 | 4/1967 | Keller | 74/473 P |
| 2,272,897 | 2/1942 | Riesing | 74/523 |
| 1,896,893 | 2/1933 | Hartsock | 74/473 |
| 3,561,281 | 2/1971 | Wilfert | 74/473 |
| 3,583,184 | 6/1971 | Papale | 74/473 X |

Primary Examiner—Milton Kaufman
Assistant Examiner—Ronald C. Capossela
Attorney—W. E. Finken, A. M. Heiter and C. R. White

[57] ABSTRACT

A selector lever for a stepped-ratio gearbox or automatic transmission of a motor vehicle comprises an upper lever member of plastics material, a lower lever member of metal, and damping means resiliently interconnecting the upper and lower lever members. An enlarged upper end portion of the upper lever member forms a control knob for the selector lever, such that the one-piece construction constituting the upper lever member can be produced by injection-moulding.

A metal vibration-damper weight may be incorporated in the upper lever member, in the vicinity of the control knob. A closure member mounted in the control knob may show the shift pattern or have a decorative function, or alternatively the control knob may carry a press-button for operating a reverse blocker arrangement of an associated gearbox.

9 Claims, 5 Drawing Figures

PATENTED SEP 26 1972 3,693,467
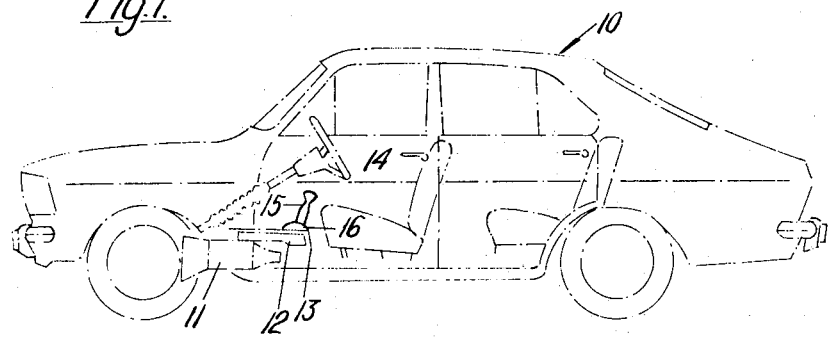
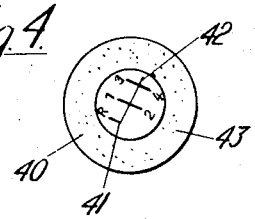
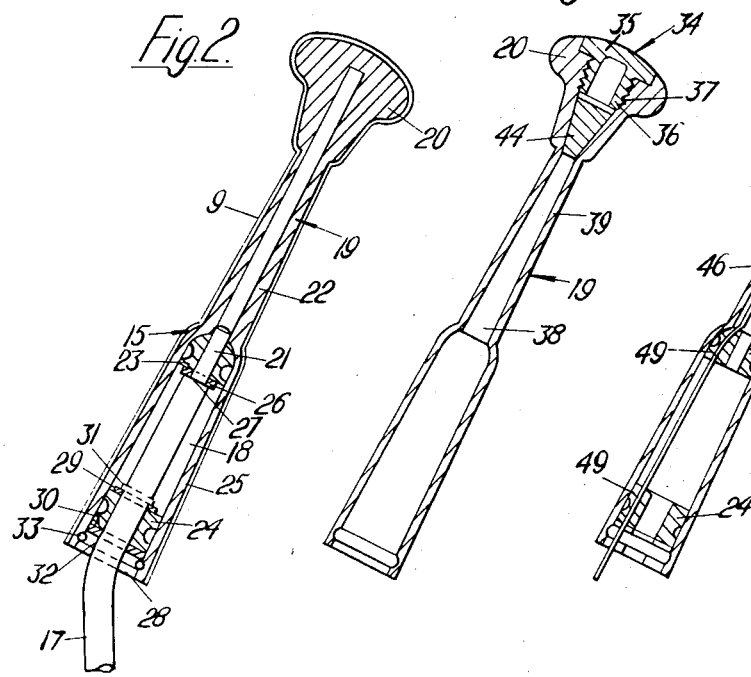
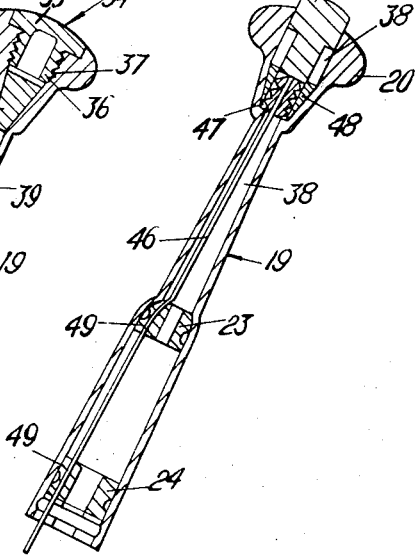
Inventor
Adolf Oehl
BY
Charles R. White
Attorney

SELECTOR LEVERS FOR VARIABLE-RATIO TRANSMISSIONS OF MOTOR VEHICLES

This invention relates to selector levers for motor vehicle variable-ratio transmissions.

Such selector levers are applicable to the shifting of stepped-ratio gears in conventional motor vehicle gearboxes, and to the selection of speed ranges in automatic transmissions in motor vehicles. Selector levers of this kind must be of adequate strength, and should be highly insensitive to heat.

In a prior construction of a selector lever, a metallic lower lever member leads into the interior of a gearbox. At its extremity situated outside the gearbox, this lower lever member is resiliently connected to an upper lever member, also of metal, by way of interposed damping means. This is done by mounting the lower lever portion, with the interposed damping means, in a hollow lower end portion of the upper lever member. A control knob of plastics material, for example polyamide plastics material reinforced by glass fiber, is secured to the top end of the upper lever member. The upper lever portion narrows in a tapering fashion from its hollow lower end portion towards the control knob.

In the production of the prior selector lever, the lower lever member is made from metal by normal production methods, the upper lever member is formed from a metal tube by a rolling procedure, and the control knob is made of plastics material, for example by injection moulding. For decorative purposes the upper lever member may be chromium plated, and the control knob is shrunk on by the action of heat, and secured by adhesive to the upper lever member. A disadvantage of this prior selector lever is that its production is relatively costly.

An object of the present invention is to provide a new and improved selector lever for motor vehicle variable-ratio transmissions which will retain advantages of the prior selector lever while reducing lever cost.

In accordance with the present invention, the upper lever member of the selector lever is made of one-piece construction of plastics material, with an enlarged upper end portion of the upper lever member forming a control knob for the selector lever. This reduces the number of parts to be made of metal; indeed, no more than the lower lever member need consist of metal, and an injection-moulding process can be used for producing the upper lever member, including the control knob. Thereby, production can be considerably simplified, inasmuch as the control knob and the remainder of the upper lever member can be made in a single injection-moulding operation, without any need for additional shrinking-on and adhesion stages as used for attaching a separate control knob.

An advantageous preferred feature is the use of a vibration-damper weight, generally of metal, in a hollow portion of the upper lever member in the vicinity of the control knob. The upper lever member of plastics material is lighter in weight than the metal upper lever member of the prior construction, and so the lever may tend to vibrate and give rise to undesired noise. By arranging a relatively heavy metal body, for example of lead, in the interior of the upper lever member, generally at the level of the control knob, vibration of the gearshift lever can be suppressed and the associated noise consequently eliminated.

The plastics material used for the upper lever member may be a glass fiber-reinforced polyamide plastics material, or acrylonitrile-butadienne-styrene plastics material. Such kinds of plastics are very suitable materials to use for selector levers, on account of their excellent mechanical strength and immunity to temperature. By appropriate choice of two different plastics, for instance glass fiber-reinforced polyamide plastics material with a resilient material, for example polyvinyl chloride, used as a surface layer, a somewhat yieldable construction is possible. Immunity to temperature is important because temperatures of about 60° C may develop for example at the lower lever member. The upper lever member may be produced either by injection-moulding as previously referred to or by extrusion, so that a reduction in manufacturing cost as compared with the cost of the prior selector lever is possible.

The plastics material used for the upper lever member may be colored. Polyamides are particularly easy to color, so making it a simple matter if desired to match the color of the selector lever to that of the vehicle upholstery.

The upper lever member may be provided either entirely or partially with fine graining of slight surface roughness in order to impart a leather-like appearance and to ensure a better grip.

Also, a decorative member may be snapped or otherwise fitted into a hollow recess-like portion of the control knob. On its surface, this decorative member may bear for example the shift pattern for gear change. In the case of selector levers for automatic transmissions, the decorative member may be formed as a rosette or serve any other purely aesthetic purpose.

According to another preferred feature, the upper lever member is made with a through axial aperture, and means for operating a reverse-blocker arrangement for a gearbox lead from the control knob and pass axially through the upper lever member, and through apertures in the damping means. The selector lever may therefore by used to advantage even for gearboxes having a reverse gear safety blocker.

The appended claims define the scope of the invention claimed. The invention and how it can be performed are hereinafter particularly described with reference to the accompanying drawing, in which:

FIG. 1 schematically shows a passenger car in which a gearbox and a selector lever in accordance with the invention are indicated as visible from outside the vehicle;

FIG. 2 shows one embodiment of a selector lever usable in the FIG. 1 context, the lever being shown in longitudinal section to an enlarged scale as compared with FIG. 1;

FIG. 3 shows an upper lever member generally similar to a corresponding part of FIG. 2, but with a metallic member in the interior and a decorative member in the control knob;

FIG. 4 is a plan of the control knob in the FIG. 3 arrangement; and

FIG. 5 shows part of a selector lever having a through axial aperture in an upper lever member, containing means for operating a reverse-blocker arrangement of a variable ratio-transmission.

As is shown in FIG. 1 of the drawing, a passenger vehicle 10 includes a stepped-ratio gearbox 11 which constitutes a variable-ratio transmission in the drive line of the vehicle, and has a housing extension 12. This housing extension 12 contains motion-transmitting levers (not shown) which lead to the gearbox 11 from a remote-control gearshift console 13 inside the passenger space 14 of the vehicle. A gearshift lever 15 (selector lever) is arranged on the console 13, with the lower end of the gearshift shift lever covered by a protective gaiter 16.

As is shown in FIG. 2 of the drawing, the gearshift lever 15 includes a metal lower lever member 17 which extends into the housing extension 12 shown in FIG. 1 and the upper end portion of which extends with play into the hollow interior 18 of a tubular lower end portion 25 of an upper lever member 19.

The upper lever member 19 is of one-piece construction of plastics material, specifically a colored polyamide plastics material reinforced with glass fiber, and includes an enlarged upper end portion forming a control knob 20 for the gearshift lever. The upper lever member 19 also includes a resilient surface layer 9 of flexible plastics material, specifically soft elastic polyvinyl chloride.

The lower lever member 17 has a reduced-diameter spigot-like upper end 21 accommodated in a substantially cylindrical axially extending aperture in a shank portion 22 of the upper lever member 19, this aperture forming an axial extension of the hollow interior 18 of the tubular lower end portion 25, as is advantageous for production of the upper lever member 19 by injection moulding. A pair of axially spaced annular rubber blocks 23 and 24 are arranged as damping means in the annular space between the lower lever member 17 and the tubular lower end portion 25 of the upper lever member 19. The rubber block 23 abuts, in an axially downward direction, a washer 26 resting on an annular shoulder 27 between the spigot-like upper end 21 and the remainder of the lower lever member 17, and, in an axially upward direction, a dome-like internal surface of the tubular lower end portion 25. The rubber block 24 is situated near the open lower end of the hollow interior 18 of the tubular end portion 25, and bears firmly against the internal surface of the end portion 25. This block 24 is secured axially between axially spaced washers 29 and 30, which respectively abut a flange portion 31 of the lower lever member 17 and a circlip 32 (spring ring) located in an annular groove 33 in the tubular end portion 25.

The rubber blocks 23 and 24 could if desired be replaced by blocks of resilient synthetic plastics material, and could be adhesively secured to the tubular end portion 25.

The annular rubber blocks 23 and 24 resiliently connect the lower lever member 17 to the upper lever member 19, and are effective to damp the vibration and noise which emanate from the drive unit of the vehicle and which may be transmitted into the passenger space 14 via the gearshift lever 15. The connection between the upper lever member 19 and the lower lever member 17 prevents relative displacement of these lever members.

In FIG. 3, for simplicity the damping means and the lower lever portion 17 are not shown. In this embodiment, there is a through axial aperture 38 in the upper lever member 19, with the axially upper end of the aperture closed by a mushroom-shaped closure plug member 34 which is introduced from above with a push fit into the aperture in the control knob 20. The closure member 34 comprises a disc-like head portion 35 and an associated hollow stem portion 36 formed with annular external projections 37.

Alternatively, a helically extending external projection, in the form of a screw thread, could be used.

The through aperture 38 in the upper lever member 19 is flared conically outwardly within the control knob 20 so that, after introduction of the closure member 34, its stem portion 36 bears firmly against the internal surface of the tubular wall 39 of the through axial aperture 38. The head portion 35 of the closure member 34 is fitted into the control knob 20 substantially without a joint. As is shown in FIG. 4, the surface 40 of the head portion 35 indicates the gearshift pattern 41, in the form of imprints 42 which are made clearly visible by the use of a color contrasting with the color of the remainder of the surface 40 of the head portion, and with the surface 43 of the upper lever member 19. In the region of the gearshift pattern 41 the surface 40 of the head portion 35 is made smooth, whereas the surface 43 of the upper lever member 19, including the control knob 20, is provided at the time of the injection-moulding process with fine graining of slight surface roughness so that the gearshift lever 15 acquires a matt leather-like appearance, with an excellent grip at the control knob 20. The upper lever member 19 has a resilient surface layer (not shown) similar to that described in relation to the FIG. 1 embodiment.

A frusto-conical metal vibration-damper weight 44, made of lead in this embodiment, is arranged within the through axial aperture 38 in the vicinity of the control knob 20, directly under the closure member 34, and has a size such that it is forced against a corresponding frusto-conical internal surface of the tubular wall 39 by the closure member 34, to thereby prevent rattling of the weight 44.

A vibration-damper weight could alternatively be disposed within the closure member 34. Depending on the mean frequency of the vibrations initiated in the gearbox, and on the weight of the gearshift lever and the length of the lever above its vibration center, it is possible to select an appropriate mass and position for the weight such that the frequency of the natural vibration of the gearshift lever is as different as possible from that of the initiating vibration.

In the embodiment shown in FIG. 5, the upper lever member 19 again has a through axial aperture 38, which in this case has a cylindrical end portion in the region of the control knob 20. The upper lever member 19 has a resilient surface layer (not shown) similar to that described in relation to the FIG. 1 embodiment. A mushroom-shaped press-button 45, marked with the gearshift pattern 41 as described in relation to FIG. 4, is subject to the action of a return spring in the form of a compression coil spring 47 (indicated schematically), whereby the press-button 45 in its rest position projects somewhat above the surface of the control knob 20. A control rod 46 serving as a push rod for actuating a reverse blocker arrangement (not shown) of the gearbox is connected to the press-button 45, and leads in the axially downward direction through openings 49 in the rubber blocks 23 and 24 into the gearbox. Depressing the press-button 45 effects disengagement of the reverse blocker arrangement by means of the control rod 46, thereby permitting a shift into the reverse-ratio position. Once the vehicle is travelling in reverse, and also in the forward gear ratios, the press-button 45 is returned by its spring 47 to the rest position shown in FIG. 5.

This gearshift lever with means for actuating the reverse blocker arrangement is also provided with an annular metal vibration-damper weight 48 in a frustoconically-surfaced region of the hollow interior 38, in order to prevent vibration, and the return spring is disposed coaxially within the weight and seated at its respective ends on the press-button and an annular shoulder of the upper lever member 19 respectively.

The embodiments described have been illustrated as gearshift levers for mechanically operated gearboxes. However, generally similar selector levers in accordance with the present invention may advantageously be utilized as selector levers for motor vehicle automatic transmissions.

I claim:

1. A selector lever for a variable-ratio transmission of a motor vehicle, comprising:
    an upper lever member of one-piece construction of plastics material, an enlarged upper end portion of said upper lever member forming a control knob for said selector lever, and a tubular lower end portion of said upper lever member having a hollow interior;
    a lower lever member, means for connecting said lower lever member to said variable-ratio transmission, and an upper end portion of said lower lever member extending with play into the hollow interior of said tubular lower end portion of said upper lever member;
    and vibration damping means disposed between said lower end portion of said upper lever member and said upper end portion of said lower lever member, and resiliently interconnecting said upper and lower lever members.

2. A selector lever according to claim 1, in which said upper lever member has an axially extending aperture leading from said hollow interior of said lower end portion, said vibration damping means being operatively disposed in said hollow interior, and said lower lever member being an elongated metallic rod extending through said vibration damping means into said aperture.

3. A selector lever according to claim 1 in which said upper lever member has an aperture extending from said hollow interior of said lower portion, said lower lever member being a metal rod disposed in said hollow end portion and having an extension projecting into said aperture and terminating intermediate the ends of said upper lever member.

4. A selector lever according to claim 1, in which said lower lever member is an elongated metallic member, said upper end portion of said metallic member being disposed in said hollow interior upper lever member and having an extension fitting into said upper lever member, and said vibration damping means comprising axially spaced rubber-like rings operatively disposed in said hollow interior and secured to said lower lever member and contacting the inner walls of said upper lever member forming said hollow interior.

5. A selector lever according to claim 1, in which said vibration damping means comprises axially spaced rings of a rubber-like material secured in said hollow interior of said upper lever member to provide a yielding connection between said upper and lower lever member, said rings having openings therein, and said lower lever member being a metallic rod having an end portion which extends into said openings and are gripped by the walls of said rings forming the openings therein.

6. A selector lever for a variable-ratio transmission of a motor vehicle, comprising:
    an upper lever member which is of one-piece construction of plastics material, an enlarged upper end portion of said upper lever member forming a control knob for said selector lever and having a hollow interior, and a tubular lower end portion of said upper lever member having a hollow interior in communication with the hollow interior of said control knob;
    a lower lever member of metal, means for connecting said lower lever member to said variable-ratio transmission, and an upper end portion of said lower lever member extending with play into the hollow interior of said tubular lower end portion of said upper lever member;
    damping means disposed between said lower end portion of said upper lever member and said upper end portion of said lower lever member, and resiliently interconnecting said upper and lower lever members;
    and a vibration-damper weight disposed in said hollow interior of said control knob.

7. A selector lever for a variable-ratio transmission of a motor vehicle, comprising:
    an upper lever member which is of one-piece construction of plastics material and has an axially extending through aperture, and an enlarged upper end portion of said upper lever member formed as a control knob for said selector lever;
    a lower lever member of metal, means for connecting said lower lever member to said variable-ratio transmission, and an upper end portion of said lower lever member extending with play into said axially extending through aperture in said upper lever member such that said upper end portion of said lower lever member and a lower end portion of said upper lever member are in coaxial spaced overlapping relation;
    axially spaced first and second annular damping means disposed between said overlapping portions and resiliently interconnecting said upper and lower lever members;
    a vibration-damper weight disposed in said axially extending through aperture in said upper lever member in the vicinity of said control knob;
    and a closure member closing an upper end portion of said axially extending through aperture.

8. A selector lever according to claim 7, in which said vibration-damper weight is of generally frustoconical form, and said closure member is arranged to maintain said vibration-damper weight in vibration-free engagement with a corresponding frustoconical internal wall surface portion of said axially extending through aperture.

9. A selector lever for a variable-ratio transmission of a motor vehicle, comprising:
- an upper lever member which is of one-piece construction of plastics material and has an axially extending through aperture, and an enlarged upper end portion of said upper lever member formed as a control knob for said selector lever;
- a lower lever member of metal, means for connecting said lower lever member to said variable-ratio transmission, and an upper end portion of said lower lever member extending with play into said axially extending through aperture in said upper lever member such that said upper end portion of said lower lever member and a lower end portion of said upper lever member are in coaxial spaced overlapping relation;
- axially spaced first and second annular damping means disposed between said overlapping portions and resiliently interconnecting said upper and lower lever members;
- an annular vibration-damper weight disposed in said axially extending through aperture in said upper lever member in the vicinity of said control knob;
- a push-button slidable in, and projecting from, an upper end portion of said axially extending through aperture in said upper lever member;
- a control rod operatively connected to said push-button and extending through said axially extending through aperture in said upper lever member, and through respective apertures in said damping means;
- means associated with said control rod for operating a reverse blocker arrangement of said variable-ratio transmission;
- and a compression coil spring disposed coaxially within said vibration-damper weight and seated at its respective ends on said push-button and on said upper lever member, to thereby form a return spring for said push-button.

* * * * *